United States Patent
Luo et al.

(10) Patent No.: US 11,090,753 B2
(45) Date of Patent: Aug. 17, 2021

(54) SYSTEM AND METHOD FOR DETERMINING WELD TRAVEL SPEED

(71) Applicant: ILLINOIS TOOL WORKS INC., Glenview, IL (US)

(72) Inventors: Jyi-Jiin Luo, Morton Grove, IL (US); Christopher J. Nelli, Schaumburg, IL (US); Todd Earl Holverson, Appleton, WI (US); Andrew Patrick Mulroy, Houston, TX (US)

(73) Assignee: Illinois Tool Works Inc., Glenview, IL (US)

( * ) Notice: Subject to any disclaimer, the term of this patent is extended or adjusted under 35 U.S.C. 154(b) by 325 days.

(21) Appl. No.: 14/304,388

(22) Filed: Jun. 13, 2014

(65) Prior Publication Data

US 2014/0374396 A1   Dec. 25, 2014

Related U.S. Application Data

(60) Provisional application No. 61/837,905, filed on Jun. 21, 2013.

(51) Int. Cl.
*B23K 9/095* (2006.01)
*B23K 9/028* (2006.01)
*B23K 101/06* (2006.01)

(52) U.S. Cl.
CPC .......... *B23K 9/0953* (2013.01); *B23K 9/0282* (2013.01); *B23K 9/0956* (2013.01); *B23K 2101/06* (2018.08)

(58) Field of Classification Search
CPC .. B23K 9/0956; B23K 9/0953; B23K 9/0282; B23K 2201/06

USPC .................................................... 239/130.01
See application file for complete search history.

(56) References Cited

U.S. PATENT DOCUMENTS

| | | | |
|---|---|---|---|
| 1,340,270 A | 5/1920 | Emil | |
| 2,045,800 A | 6/1936 | Walther | |
| 2,045,801 A | 6/1936 | Richter | |
| 2,045,802 A | 6/1936 | Walther | |
| 2,333,192 A | 10/1942 | Moberg | |

(Continued)

FOREIGN PATENT DOCUMENTS

| CA | 2311685 | 12/2001 |
|---|---|---|
| CA | 2517874 | 12/2001 |

(Continued)

OTHER PUBLICATIONS

International Search Report from PCT application No. PCT/US2014/042589, dated Nov. 3, 2014, 14 pgs.

(Continued)

*Primary Examiner* — Joseph A Greenlund
(74) *Attorney, Agent, or Firm* — McAndrews, Held & Malloy, Ltd.

(57) ABSTRACT

A system and method for determining weld travel speed. In one example, a welding system includes one or more sensors configured to provide a first indication correspond to a welding arc at a first time and to provide a second indication correspond to the welding arc at a second time. The welding system also includes processing circuitry configured to receive the first indication, to receive the second indication, and to determine a weld travel speed based on a weld length of the workpiece and a difference between the first and second times.

15 Claims, 5 Drawing Sheets

(56) References Cited

U.S. PATENT DOCUMENTS

| | | | | |
|---|---|---|---|---|
| 2,351,910 | A | 6/1944 | Blankenbuehler | |
| 3,463,900 | A * | 8/1969 | Downing | H01J 37/3045 219/121.13 |
| 3,466,420 | A * | 9/1969 | Downing | H01J 37/3045 219/121.13 |
| 3,702,915 | A | 11/1972 | Vilkas | |
| 3,867,769 | A | 2/1975 | Schow | |
| 4,028,522 | A | 6/1977 | Chihoski | |
| 4,041,615 | A | 8/1977 | Whitehill | |
| 4,044,377 | A | 8/1977 | Bowerman | |
| 4,124,944 | A | 11/1978 | Blair | |
| 4,132,014 | A | 1/1979 | Schow | |
| 4,144,766 | A | 3/1979 | Wehrmeister | |
| 4,224,501 | A | 9/1980 | Lindbom | |
| 4,396,945 | A | 8/1983 | DiMatteo | |
| 4,399,346 | A * | 8/1983 | Kearney | B23K 9/0956 219/124.34 |
| 4,452,589 | A | 6/1984 | Denison | |
| 4,459,114 | A | 7/1984 | Barwick | |
| 4,484,059 | A * | 11/1984 | Lillquist | B23K 9/0956 219/124.34 |
| 4,518,361 | A | 5/1985 | Conway | |
| 4,532,405 | A | 7/1985 | Corby, Jr. | |
| 4,541,055 | A | 9/1985 | Wolfe | |
| 4,555,614 | A * | 11/1985 | Morris | B23K 9/0956 219/130.01 |
| 4,577,499 | A | 3/1986 | Silke | |
| 4,581,518 | A | 4/1986 | Takahashi | |
| 4,591,689 | A | 5/1986 | Brown | |
| 4,594,497 | A | 6/1986 | Takahashi | |
| 4,595,368 | A | 6/1986 | Cole | |
| 4,595,820 | A | 6/1986 | Richardson | |
| 4,609,806 | A | 9/1986 | Grabkowski | |
| 4,628,176 | A | 12/1986 | Kojima | |
| 4,638,146 | A | 1/1987 | Koyama | |
| 4,680,014 | A | 7/1987 | Paton | |
| 4,689,021 | A | 8/1987 | Vasiliev | |
| 4,711,986 | A | 12/1987 | Lillquist | |
| 4,716,273 | A | 12/1987 | Paton | |
| 4,721,947 | A | 1/1988 | Brown | |
| 4,728,768 | A | 3/1988 | Cueman | |
| 4,739,404 | A | 4/1988 | Richardson | |
| 4,867,685 | A | 9/1989 | Brush | |
| 4,868,649 | A | 9/1989 | Gaudin | |
| 4,881,678 | A | 11/1989 | Gaudin | |
| 4,931,018 | A | 6/1990 | Herbst | |
| 4,937,427 | A | 6/1990 | McVicker | |
| 4,943,702 | A | 7/1990 | Richardson | |
| 4,954,690 | A | 9/1990 | Kensrue | |
| 4,996,409 | A | 2/1991 | Paton | |
| 5,045,669 | A | 9/1991 | Ortiz, Jr. | |
| 5,061,841 | A | 10/1991 | Richardson | |
| 5,185,561 | A | 2/1993 | Good | |
| 5,211,564 | A | 8/1993 | Martinez | |
| 5,275,327 | A | 1/1994 | Watkins | |
| 5,283,418 | A | 2/1994 | Bellows | |
| 5,304,774 | A | 4/1994 | Durheim | |
| 5,306,893 | A | 4/1994 | Morris | |
| 5,320,538 | A | 6/1994 | Baum | |
| 5,334,816 | A | 8/1994 | Sugiyama | |
| 5,343,011 | A | 8/1994 | Fujii | |
| 5,380,978 | A | 1/1995 | Pryor | |
| 5,397,872 | A | 3/1995 | Baker | |
| 5,426,732 | A | 6/1995 | Boies | |
| 5,464,957 | A | 11/1995 | Kidwell | |
| 5,514,846 | A | 5/1996 | Cecil | |
| 5,517,420 | A | 5/1996 | Kinsman | |
| 5,521,843 | A | 5/1996 | Hashima | |
| 5,571,431 | A | 11/1996 | Lantieri | |
| 5,617,335 | A | 4/1997 | Hashima | |
| 5,659,479 | A | 8/1997 | Duley | |
| 5,674,415 | A | 10/1997 | Leong | |
| 5,675,229 | A | 10/1997 | Thorne | |
| 5,681,490 | A | 10/1997 | Chang | |
| 5,698,120 | A | 12/1997 | Kurosawa | |
| 5,708,253 | A | 1/1998 | Bloch | |
| 5,709,219 | A | 1/1998 | Chen | |
| 5,747,042 | A | 5/1998 | Choquet | |
| 5,823,785 | A | 10/1998 | Matherne, Jr. | |
| 5,832,139 | A | 11/1998 | Batterman | |
| 5,856,844 | A | 1/1999 | Batterman | |
| 5,930,093 | A | 7/1999 | Morrissett | |
| 5,999,909 | A | 12/1999 | Rakshit | |
| 6,018,729 | A | 1/2000 | Zacharia | |
| 6,039,494 | A | 3/2000 | Pearce | |
| 6,049,059 | A | 4/2000 | Kim | |
| 6,051,805 | A | 4/2000 | Vaidya | |
| 6,087,626 | A * | 7/2000 | Hutchison | B23K 9/091 219/130.01 |
| 6,130,407 | A * | 10/2000 | Villafuerte | B23K 9/0956 219/130.01 |
| 6,155,475 | A | 12/2000 | Ekelof | |
| 6,163,946 | A | 12/2000 | Pryor | |
| 6,226,395 | B1 | 5/2001 | Gilliland | |
| 6,236,017 | B1 | 5/2001 | Smartt | |
| 6,242,711 | B1 | 6/2001 | Cooper | |
| 6,271,500 | B1 | 8/2001 | Hirayama | |
| 6,290,740 | B1 | 9/2001 | Schaefer | |
| 6,301,763 | B1 | 10/2001 | Pryor | |
| 6,315,186 | B1 | 11/2001 | Friedl | |
| 6,329,635 | B1 | 12/2001 | Leong | |
| 6,337,458 | B1 | 1/2002 | Lepeltier | |
| 6,371,765 | B1 | 4/2002 | Wall | |
| 6,441,342 | B1 | 8/2002 | Hsu | |
| 6,445,964 | B1 | 9/2002 | White | |
| 6,476,354 | B1 | 11/2002 | Jank | |
| 6,479,793 | B1 | 11/2002 | Wittmann | |
| 6,506,997 | B2 | 1/2003 | Matsuyama | |
| 6,516,300 | B1 | 2/2003 | Rakshit | |
| 6,572,379 | B1 | 6/2003 | Sears | |
| 6,583,386 | B1 | 6/2003 | Ivkovich | |
| 6,596,972 | B1 | 7/2003 | Di Novo | |
| 6,614,002 | B2 | 9/2003 | Weber | |
| 6,621,049 | B2 | 9/2003 | Suzuki | |
| 6,647,288 | B2 | 11/2003 | Madill | |
| 6,697,761 | B2 | 2/2004 | Akatsuka | |
| 6,703,585 | B2 | 3/2004 | Suzuki | |
| 6,710,298 | B2 | 3/2004 | Eriksson | |
| 6,723,957 | B2 * | 4/2004 | Holverson | B23K 9/0213 219/130.51 |
| 6,728,582 | B1 | 4/2004 | Wallack | |
| 6,734,393 | B1 | 5/2004 | Friedl | |
| 6,744,011 | B1 | 6/2004 | Hu | |
| 6,750,428 | B2 | 6/2004 | Okamoto | |
| 6,768,974 | B1 | 7/2004 | Nanjundan | |
| 6,839,049 | B1 | 1/2005 | Koizumi | |
| 6,857,553 | B1 | 2/2005 | Hartman | |
| 6,868,726 | B2 | 3/2005 | Lemkin | |
| 6,910,971 | B2 | 6/2005 | Alsenz | |
| 6,927,360 | B2 | 8/2005 | Artelsmair | |
| 6,937,329 | B2 | 8/2005 | Esmiller | |
| 6,964,364 | B2 * | 11/2005 | Parada | B23K 9/1272 219/706 |
| 6,974,931 | B2 * | 12/2005 | Holverson | B23K 9/0282 219/130.5 |
| 6,977,357 | B2 | 12/2005 | Hsu | |
| 6,995,536 | B2 | 2/2006 | Challoner | |
| 7,015,419 | B2 | 3/2006 | Hackl | |
| 7,045,742 | B2 | 5/2006 | Feichtinger | |
| 7,132,617 | B2 | 11/2006 | Lee | |
| 7,132,623 | B2 | 11/2006 | DeMiranda | |
| 7,150,047 | B2 | 12/2006 | Fergason | |
| 7,181,413 | B2 | 2/2007 | Hadden | |
| 7,342,210 | B2 | 3/2008 | Fergason | |
| 7,358,458 | B2 | 4/2008 | Daniel | |
| 7,465,230 | B2 | 12/2008 | LeMay | |
| 7,474,760 | B2 | 1/2009 | Hertzman | |
| 7,523,069 | B1 | 4/2009 | Friedl | |
| 7,564,005 | B2 | 7/2009 | Cabanaw | |
| 7,574,172 | B2 | 8/2009 | Clark | |
| D614,217 | S | 4/2010 | Peters | |
| 7,698,094 | B2 | 4/2010 | Aratani | |
| D615,573 | S | 5/2010 | Peters | |

(56) References Cited

U.S. PATENT DOCUMENTS

| | | |
|---|---|---|
| 7,789,811 B2 | 9/2010 | Cooper |
| 7,826,984 B2 | 11/2010 | Sjostrand |
| 7,831,098 B2 | 11/2010 | Melikian |
| 7,839,416 B2 | 11/2010 | Ebensberger |
| 7,845,560 B2 | 12/2010 | Emanuel |
| D631,074 S | 1/2011 | Peters |
| 7,899,618 B2 | 3/2011 | Ledet |
| 7,962,967 B2 | 6/2011 | Becker |
| 8,019,144 B2 | 9/2011 | Sugihara |
| 8,100,694 B2 | 1/2012 | Portoghese |
| 8,244,494 B2 * | 8/2012 | Garg ................... G01B 7/14 |
| | | 702/149 |
| 8,248,324 B2 | 8/2012 | Nangle |
| 8,274,013 B2 * | 9/2012 | Wallace ............. B23K 9/0953 |
| | | 219/124.34 |
| 8,316,462 B2 | 11/2012 | Becker |
| 8,406,682 B2 | 3/2013 | Elesseily |
| 8,431,862 B2 | 4/2013 | Kachline |
| 8,432,476 B2 | 4/2013 | Ashforth |
| 8,512,043 B2 | 8/2013 | Choquet |
| 8,657,605 B2 | 2/2014 | Wallace |
| 8,680,434 B2 * | 3/2014 | Stoger ................ B23K 9/0956 |
| | | 219/137.7 |
| 8,681,178 B1 | 3/2014 | Tseng |
| 8,692,157 B2 | 4/2014 | Daniel |
| 8,698,843 B2 | 4/2014 | Tseng |
| 8,747,116 B2 | 6/2014 | Zboray |
| 8,834,168 B2 | 9/2014 | Peters |
| 8,851,896 B2 | 10/2014 | Wallace |
| 8,860,760 B2 | 10/2014 | Chen |
| 8,884,177 B2 * | 11/2014 | Daniel ................ B23K 9/0953 |
| | | 219/61.5 |
| 8,915,740 B2 | 12/2014 | Zboray |
| 8,953,909 B2 | 2/2015 | Guckenberger |
| RE45,398 E * | 3/2015 | Wallace ............. B23K 9/0953 |
| | | 219/137 R |
| 8,990,842 B2 | 3/2015 | Rowley |
| 9,011,154 B2 | 4/2015 | Kindig |
| 9,266,182 B2 * | 2/2016 | Hung ...................... B23K 9/32 |
| 9,352,411 B2 * | 5/2016 | Batzler ............... G09B 19/003 |
| 9,442,481 B2 * | 9/2016 | Davidson ........... B23K 9/0953 |
| 9,483,959 B2 * | 11/2016 | Wallace ................. G09B 9/00 |
| 9,511,443 B2 * | 12/2016 | Pfeifer ................ B23K 9/0956 |
| 10,643,495 B2 * | 5/2020 | Boettcher ............. B23K 9/095 |
| 2001/0032508 A1 | 10/2001 | Lemkin |
| 2002/0114653 A1 | 8/2002 | Gatta |
| 2002/0153354 A1 | 10/2002 | Norby |
| 2003/0011673 A1 | 1/2003 | Eriksson |
| 2003/0092496 A1 | 5/2003 | Alsenz |
| 2003/0172032 A1 | 9/2003 | Choquet |
| 2004/0069754 A1 | 4/2004 | Bates |
| 2004/0175684 A1 | 9/2004 | Kaasa |
| 2004/0251910 A1 | 12/2004 | Smith |
| 2005/0006363 A1 | 1/2005 | Hsu |
| 2005/0017152 A1 | 1/2005 | Fergason |
| 2005/0127052 A1 | 6/2005 | Spencer |
| 2005/0133488 A1 | 6/2005 | Blankenship |
| 2005/0135682 A1 | 6/2005 | Abrams |
| 2005/0197115 A1 | 9/2005 | Clark |
| 2005/0256611 A1 | 11/2005 | Pretlove |
| 2006/0010551 A1 | 1/2006 | Bishop |
| 2006/0136183 A1 | 6/2006 | Choquet |
| 2006/0163228 A1 | 7/2006 | Daniel |
| 2006/0173619 A1 | 8/2006 | Brant |
| 2006/0241432 A1 | 10/2006 | Herline |
| 2007/0038400 A1 | 2/2007 | Lee |
| 2007/0114215 A1 | 5/2007 | Bill |
| 2007/0164006 A1 | 7/2007 | Burgstaller |
| 2007/0187378 A1 * | 8/2007 | Karakas ................. B23K 9/095 |
| | | 219/130.21 |
| 2007/0188606 A1 | 8/2007 | Atkinson |
| 2007/0248261 A1 | 10/2007 | Zhou |
| 2007/0264620 A1 | 11/2007 | Maddix |
| 2007/0278196 A1 | 12/2007 | James |
| 2008/0038702 A1 | 2/2008 | Choquet |
| 2008/0061113 A9 | 3/2008 | Seki |
| 2008/0124698 A1 | 5/2008 | Ebensberger |
| 2008/0149608 A1 | 6/2008 | Albrecht |
| 2008/0158502 A1 | 7/2008 | Becker |
| 2008/0169277 A1 | 7/2008 | Achtner |
| 2008/0314887 A1 | 12/2008 | Stoger |
| 2009/0005728 A1 | 1/2009 | Weinert |
| 2009/0057286 A1 | 3/2009 | Ihara |
| 2009/0109128 A1 | 4/2009 | Nangle |
| 2009/0139970 A1 * | 6/2009 | Grupp ................ B23K 37/0229 |
| | | 219/137 R |
| 2009/0146359 A1 | 6/2009 | Canfield |
| 2009/0152251 A1 | 6/2009 | Dantinne |
| 2009/0161212 A1 | 6/2009 | Gough |
| 2009/0173726 A1 | 7/2009 | Davidson |
| 2009/0184098 A1 * | 7/2009 | Daniel ................ B23K 9/1043 |
| | | 219/130.1 |
| 2009/0200281 A1 | 8/2009 | Hampton |
| 2009/0200282 A1 | 8/2009 | Hampton |
| 2009/0230107 A1 | 9/2009 | Ertmer |
| 2009/0231423 A1 | 9/2009 | Becker |
| 2009/0249606 A1 | 10/2009 | Diez |
| 2009/0298024 A1 | 12/2009 | Batzler |
| 2010/0048273 A1 | 2/2010 | Wallace |
| 2010/0062405 A1 | 3/2010 | Zboray |
| 2010/0062406 A1 | 3/2010 | Zboray |
| 2010/0133247 A1 | 6/2010 | Mazumder |
| 2010/0201803 A1 | 8/2010 | Melikian |
| 2010/0207620 A1 | 8/2010 | Gies |
| 2010/0224610 A1 | 9/2010 | Wallace |
| 2010/0283588 A1 | 11/2010 | Gomez |
| 2010/0291313 A1 | 11/2010 | Ling |
| 2011/0000892 A1 | 1/2011 | Mueller |
| 2011/0006047 A1 | 1/2011 | Penrod |
| 2011/0091846 A1 | 4/2011 | Kreindl |
| 2011/0092828 A1 | 4/2011 | Spohn |
| 2011/0114615 A1 | 5/2011 | Daniel |
| 2011/0117527 A1 | 5/2011 | Conrardy |
| 2011/0183304 A1 | 7/2011 | Wallace |
| 2011/0186615 A1 | 8/2011 | Gatlin |
| 2011/0220616 A1 | 9/2011 | Mehn |
| 2011/0220619 A1 | 9/2011 | Mehn |
| 2011/0249090 A1 | 10/2011 | Moore |
| 2011/0290765 A1 | 12/2011 | Albrecht |
| 2011/0313731 A1 | 12/2011 | Vock |
| 2012/0072021 A1 | 3/2012 | Walser |
| 2012/0077174 A1 | 3/2012 | DePaul |
| 2012/0105476 A1 | 5/2012 | Tseng |
| 2012/0122062 A1 | 5/2012 | Yang |
| 2012/0180180 A1 | 7/2012 | Steve |
| 2012/0189993 A1 | 7/2012 | Kindig |
| 2012/0231894 A1 | 9/2012 | Nicora |
| 2012/0248080 A1 | 10/2012 | Hutchison |
| 2012/0248083 A1 | 10/2012 | Garvey |
| 2012/0291172 A1 | 11/2012 | Wills |
| 2012/0298640 A1 | 11/2012 | Conrardy |
| 2012/0318775 A1 | 12/2012 | Schwarz |
| 2012/0323496 A1 | 12/2012 | Burroughs |
| 2013/0040270 A1 | 2/2013 | Albrecht |
| 2013/0081293 A1 | 4/2013 | Delin |
| 2013/0134153 A1 * | 5/2013 | Schmitt ............. B29C 66/92921 |
| | | 219/617 |
| 2013/0189656 A1 | 7/2013 | Zboray |
| 2013/0189658 A1 | 7/2013 | Peters |
| 2013/0200882 A1 | 8/2013 | Almalki |
| 2013/0209976 A1 | 8/2013 | Postlethwaite |
| 2013/0264315 A1 | 10/2013 | Hung |
| 2013/0288211 A1 | 10/2013 | Patterson |
| 2014/0014638 A1 | 1/2014 | Artelsmair |
| 2014/0017642 A1 | 1/2014 | Postlethwaite |
| 2014/0131337 A1 | 5/2014 | Williams |
| 2014/0134579 A1 | 5/2014 | Becker |
| 2014/0134580 A1 | 5/2014 | Becker |
| 2014/0138363 A1 * | 5/2014 | Hammann ............ B23K 26/38 |
| | | 219/121.78 |
| 2014/0184496 A1 | 7/2014 | Gribetz |
| 2014/0263224 A1 | 9/2014 | Becker |
| 2014/0263227 A1 | 9/2014 | Daniel |

(56) References Cited

U.S. PATENT DOCUMENTS

| | | | |
|---|---|---|---|
| 2014/0272835 A1 | 9/2014 | Becker | |
| 2014/0272836 A1 | 9/2014 | Becker | |
| 2014/0272837 A1 | 9/2014 | Becker | |
| 2014/0272838 A1 | 9/2014 | Becker | |
| 2014/0315167 A1 | 10/2014 | Kreindl | |
| 2014/0332514 A1* | 11/2014 | Holverson | B23K 9/0956 219/130.01 |
| 2014/0374396 A1* | 12/2014 | Luo | B23K 9/0282 219/130.01 |
| 2015/0283640 A1* | 10/2015 | Walker | B23K 9/095 219/121.54 |

FOREIGN PATENT DOCUMENTS

| | | | |
|---|---|---|---|
| CA | 2549553 | 7/2004 | |
| CA | 2554498 | 4/2006 | |
| DE | 102010038902 | 2/2012 | |
| EP | 0323277 A2 | 7/1989 | |
| EP | 0878263 | 11/1998 | |
| EP | 0963744 A1 | 12/1999 | |
| EP | 1029306 | 8/2000 | |
| EP | 1295195 | 6/2001 | |
| EP | 1573699 | 9/2005 | |
| EP | 1797545 | 6/2007 | |
| EP | 2022592 | 2/2009 | |
| EP | 2022592 A1 * | 2/2009 | B23K 9/0956 |
| EP | 2292363 | 3/2011 | |
| EP | 2292363 A1 * | 3/2011 | B23K 9/0956 |
| ES | 2438440 | 1/2014 | |
| FR | 1456780 | 7/1966 | |
| FR | 2827066 | 1/2003 | |
| GB | 2454232 A | 5/2009 | |
| JP | H09220690 | 8/1997 | |
| JP | H11146387 | 5/1999 | |
| JP | 2000298427 | 10/2000 | |
| JP | 2002028782 | 1/2002 | |
| JP | 2004181493 | 7/2004 | |
| JP | 2007021542 | 2/2007 | |
| JP | 2008110388 | 5/2008 | |
| JP | 2009125790 | 6/2009 | |
| KR | 100876425 | 12/2008 | |
| KR | 20120074453 | 7/2012 | |
| SU | 972552 | 11/1982 | |
| SU | 1354234 A1 | 11/1987 | |
| SU | 1489933 A1 | 6/1989 | |
| SU | 1638145 | 3/1991 | |
| WO | 03019349 | 1/2003 | |
| WO | 2004057554 | 7/2004 | |
| WO | 2005102230 A1 | 11/2005 | |
| WO | 2005110658 A2 | 11/2005 | |
| WO | 2006034571 | 4/2006 | |
| WO | 2007009131 | 1/2007 | |
| WO | 2009022443 | 2/2009 | |
| WO | 2009053829 | 4/2009 | |
| WO | 2009060231 | 5/2009 | |
| WO | 2009092944 | 7/2009 | |
| WO | 2009146359 | 12/2009 | |
| WO | 2010000003 | 1/2010 | |
| WO | 2010020867 | 2/2010 | |
| WO | 2010020870 | 2/2010 | |
| WO | 2012137060 | 10/2012 | |
| WO | 2013138831 | 1/2013 | |
| WO | 2013023012 | 2/2013 | |
| WO | 2014007830 | 1/2014 | |

OTHER PUBLICATIONS

U.S. Appl. No. 14/304,388, filed Jun. 13, 2014, Jyi-Jiin Luo.
U.S. Appl. No. 61/597,556, filed Feb. 10, 2012, Kyle Andrew Pfeifer.
U.S. Appl. No. 13/738,770, filed Jan. 10, 2013, Kyle Andrew Pfeifer.
U.S. Appl. No. 13/740,964, filed Jan. 14, 2013, Kyle Andrew Pfeifer.
U.S. Appl. No. 13/755,984, filed Jan. 31, 2013, Kyle Andrew Pfeifer.
U.S. Appl. No. 61/837,905, filed Jun. 21, 2013, Jyi-Jiin Luo.
"Low Cost Virtual Reality Welding Training System," NSRP Joint Panel Meeting, Apr. 21, 2010, http://www.nsrp.org/6-Presentations/Joint/042110_Low_Cost_Virtual_Reality_Welder_Training_System_Fast.pdf.
"NJC Technology Displayed at ShipTech 2005", Welding Journal, vol. 84, No. 3, Mar. 2005, p. 54, https://app.aws.org/w/r/www/wj/2005/03/WJ_2005_03.pdf.
"Sheet Metal Conference XXII," Conference Program, American Welding Society, May 2006, Detroit.
"Virtual Reality Program to Train Welders for Shipbuilding", American Welding Society, Navy Joining Center, https://app.aws.org/wj/2004/04/052/.
"Virtual Reality Welder Training Initiatives: Virtual Welding Lab Pilot," Paul D. Camp Community College, Advanced Science & Automation Corporation, Northrop Grumman Newport News, Nov. 22, 2006, http://www.nsrp.org/6-Presentations/WD/103106_Virtual_Reality_Welder.pdf.
"Virtual Welding: A Low Cost Virtual Reality Welder Training System," NSRP ASE, Feb. 19, 2009, http://www.nsrp.org/6-Presentations/WD/020409_Virtual_Welding_Wilbur.pdf.
"Virtual Welding—a Low Cost Virtual Reality Welder Training System", Interim Status Report # 4, Technology Investment Agreement 2008-600, Feb. 18, 2009, http://www.nsrp.org/3-Key_Deliverables/FY08_Low-Cost_Virtual_Reality_Welder_Trainer/FY08_Low-Cost_Virtual_Reality_Welder_Trainer-Interim2.pdf.
"Vision for Welding Industry," American Welding Society, Apr. 22, 1999, http://www.aws.org/library/doclib/vision.pdf.
"Welding in Defense Industry," American Welding Society conference schedule, 2004. https://app.aws.org/conferences/defense/live_index.html.
"Welding Technology Roadmap," prepared by Energetics, Inc., Columbia, MD, in cooperation with the American Welding Society and the Edison Welding Institute, Sep. 2000.
123arc.com; Products; http://www.123arc.co/en/products/htm; accessed: Apr. 11, 2013.
123arc.com—"Weld into the future"; 2000.
Advance Program of American Welding Society Programs and Events, Nov. 11-14, 2007, Chicago.
Aiteanu, Dorian, and Axel Graeser; "Generation and Rendering of a Virtual Welding Seam in an Augmented Reality Training Environment," Proceedings of the Sixth IASTED International Conference on Visualization, Imaging, and Image Processing, Aug. 28-30, 2006, Palma de Mallorca, Spain, ED. J.J. Villaneuva, ACTA Press, 2006.
Aiteanu, Dorin, and Axel Graser, "Computer-Aided Manual Welding Using an Augmented Reality Supervisor," Sheet Metal Welding Conference XII, Livoinia, MI, May 9-12, 2006, pp. 1-14.
Aiteanu, Dorin, et al., "A Step Forward in Manual Welding: Demonstration of Augmented Reality Helmet," Institute of Automation, University of Bremen, Germany, 2003.
American Welding Society's Virtual Welding Trailer to Debut at Fabtech Careers in Welding Trailer Appeals to New Generation of Welders, Miami, Florida, Nov. 3, 2011.
American Welding Society Forms: typical Procedure Qualification Record and Welding Procedure Specification forms.
ARC+ Virtual Welding Simulator; 123 Certification Inc.; Feb. 2009; Montreal, Quebec.
ArcSentry Weld Monitoring System, Version 3, Users Manual, Native American Technologies, Golden, CO, Dec. 10, 1999.
Arvika Forum Vorstellung Projeckt PAARA, BMW Group Virtual Reality Center, Nuernberg, 2003.
Ascension Technology Corporation: Tracking 3D Worlds: http://ascension-tech.com/, Dec. 1996.
Barckhoff, J.R.; "Total Welding Managemet," American Welding Society, 2005.
Bender Shipbuilding and Repair, Co., "Virtual Welding—a Low Cost Virtual Reality Welder Training System", Technical Proposal, Jan. 23, 2008.

(56) References Cited

OTHER PUBLICATIONS

Byrd, Alex Preston, "Identifying the effects of human factors and training methods on a weld training program" (2014). Graduate Theses and Dissertations. Paper 13991.
Central Welding Supply http://www.welders-direct.com/ Feb. 29, 2000.
Choquet, Claude, ARC+: Today's Virtual Reality Solution for Welders, Jun. 1, 2008.
Choquet, Claude, ARC+ & ARC PC Welding Simulators: Teach Welders with Virtual Interactive 3D Technologies; Jul. 2010.
Cote, Allan et al. (Presenters); Virtual Reality Welder Training; Project Review for Ship Tech 2005; Project No. S1051; Mar. 1, 2005; Biloxi MS.
Cybernetics: Enhancing Human Performance found in the DTIC Review dated Mar. 2001, p. 186/19. See http://www.dtic.mil/dtic/tr/fulltext/u2/a385219.pdf.
Echtler, Florian, Fabian Stuurm, Kay Kindermann, Gudrun Klinker, Joachim Stilla, Jorn Trilk, Hesam Najafi, "The Intelligent Welding Gun: Augmented Reality for Experimental Vehicle Construction," Virtual and Augmented Reality Applications in Manufacturing, Ong S.K and Nee A.Y.C., eds., Springer Verlag, 2003, pp. 1-27.
Evaluating Two Novel Tactile Feedback Devices, by Thomas Hulin, Phillipp Kremer, Robert Scheibe, Simon Schaetzle and Carsten Preusche presented at the 4th International Conference on Enactive Interfaces, Grenoble, France, Nov. 19-22, 2007.
EWI, "EWI ArcCheck," marketing brochure, Columbus, Ohio.
EWI, "EWI SkillBuilder," marketing brochure, Columbus, Ohio.
Fast, Kenneth, Jerry Jones, and Valerie Rhoades; "Virtual Welding—A Low Cost Virtual Reality Welder Training System Phase II," National Shipbuilding Research Program (NSRP), NSRP ASE Technology Investment Agreement No. 2010-357, Feb. 29, 2012, http://www.nsrp.org/3-RA-Panel_Final_Reports/FY08_Virtual_Welder_Final_Report.pdf.
Fast et al., Virtual Training for Welding, Proceedings of the Third IEEE and ACM International Symposium on Mixed and Augmented Reality (ISMAR 2004); 0-7695-2191-6/04; 2004.
Fite-Georgel, Pierre; "Is there a Reality in Industrial Augmented Reality?" 10th IEEE International Symposium on Mixed and Augmented Reality (ISMAR), 2011.
Fridenfalk et al., Design and Validation of a Universal 6D Seam Tracking System in Robotic Welding Based on Laser Scanning, Industrial Robotics: Programming, Simulation, and Application, ISBN 3-86611-286-6, pp. 702, ARS/pIV, Germany, Dec. 2006, edited by Kin Huat.
Fronius "The Ghost": http://www.fronius.com/cps/rde/xchg/SID-3202EAB7-AE082518/fronius_interational/hs.xsl/79_15490_ENG_HTML.htm; 2006.
Fronius International; Product Description—Fronius Virtual Welding; http://www.fronius.com/cps/rde/xchg/SID-9C1850B-518E8F49/fronius_international/hs.xsl/79_15490_ENG_HTML.htm#produkt; accessed: Apr. 11, 2013.
Fronius International GmbH—Focus on Welding—Fronius Virtual Welding; http://www.fronius.com/cps/rde/xchg/SID-99869147-0110E322/fronius_intenational/hs.xsl/79_15490_ENG_HML.htm; 2006.
Fronius Perfect Welding; 06,3082, EN v01 2010 aw05; Virtual Welding—the training method of the future; Feb. 20, 2012.
ftp://www.hitl.washington.edu/pub/scivw/publications/IDS-pdf/HAPTIC1.PDF, (University of Washington): Table 11, Tactile Feedback Actuator Technologies, p. 119, below the table is a. Based on Nasser (1995, 1996).
GAWDA—Welding & Gases Today Online GAWDA Media Blog; Will Games Turn Welding into a Virtual Market? Friday, Dec. 2, 2011; http://www.weldingandgasestoday.org/blogs/Devin-OToole/index.php/ta . . . .
Gundersen, O., et al. "The Use of an Integrated Multiple Neural Network Structure for Simultaneous Prediction of Weld Shape, Mechanical Properties, and Distortion in 6063-T6 and 6082-T6 Aluminum Assemblies", Mathematical Modelling of Weld Phenomena, vol. 5, Maney Publishing, 2001.
Haptic Feedback for Virtual Reality by Grigore C. Burdea dated 1996.
Hemez, Francois M., Scott W. Doebling, "Uncertainty, Validation of Computer Models an the Myth of Numerical Predictability," Engineering Analysis Group (ESA-EA), Los Alamos National Laboratory, dated 2004.
Hillers, B, and Axel Graeser, "Direct welding arc observation withouth harsh flicker," Fabtech International and AWS Welding Show, 2007.
Hillers, B, and Axel Graeser, "Real time Arc-Welding Video Observation System," 62nd International Conference of IIW, Jul. 12-17, 2009, Singapore, 2009.
Hillers, B., et al.; "TEREBES: Welding Helmet with AR Capabilites," Institute of Automation, University of Bremen, and Institute of Industrial Engineering and Ergonomics, RWTH Aachen Universty, 2004.
Hillers, Bernd, Dorin Aiteanu, Axel Graser, "Augmented Reality—Helmet for the Manual Welding Process," Virtual and Augmented Reality Applications in Manufacturing, Institute of Automation, Universtity of Bremen, 2004.
Himperich, Frederick, "Applications in Augmented Reality in the Automotive Industry," Fachgebiet Augmented Reality, Department of Informatics, Jul. 4, 2007, p. 1-21.
http://www.123arc.com "Simulation and Certification"; 2000.
Image from Sim Welder.com—R-V's Welder Training Goes Virtual, www.rvii.com/PDF/simwelder.pdf; Jan. 2010.
Impact Spring 2012 vol. 12, No. 2, Undergraduate Research in Information Technology Engineering, University of Virginia School of Engineering & Applied Science; 2012.
Impact Welding: miscellaneous examples from current and archived website, trade shows, etc. See, e.g., http://www.impactwelding.com.
Integrated Microelectromechanical Gyroscopes; Journal of Aerospace Engineering, Apr. 2003 pp. 65-75 (p. 65) by Huikai Xie and Garry K. Fedder.
Jo et al., Visualization of Virtual Weld Beads, VRST 2009, Kyoto, Japan, Nov. 18-20, 2009; Electronics and Telecommunications Research Institute (ETRI) ACM 978-160558-869-8/09/0011.
Kiwinakiful; Holographic TV coming 2012 (as seen on BBC); http://www.youtube.com/watch?v=Ux6aD6vE9sk&feature=related, Jul. 2, 2011.
Kooima, Robert; Kinect +3D TV=Virtual Reality; http://www.youtube.com/watch?v=2MX1RinEXUM&feature=related, Feb. 26, 2011.
Leap Motion; https://www.leapmotion.com/, May 2012.
Lincoln Electric VRTEX Virtual Reality Arc Welding Trainer; http://www.lincolnelectric.com/en-us/equipment/training-equipment/paegs/vrtex360.aspx; 1999.
MacCormick, John; How does the Kinect work?; http://users.dickinson.edu/~jmac/selected-talks/kinect.pdf, Dec. 1, 2011.
NAMeS, Native American Technologies Weld Measuring Software, Users Guide, 2000.
National Science Foundation—Where Discoveries Begin—Science and Engineering's Most Powerful Statements are not Made From Words Alone—Entry Details for NSF International Science & Engineering Visualization Challenge, Public Voting ended on Mar. 9, 2012; Velu the welder by Muralitharan Vengadasalam—Sep. 30, 2011; https://nsf-scivis.skild.com/skild2/NationalScienceFoundation/viewEntryDetail.action?pid . . . .
Native American Technologies, "ArcDirector Weld Controller" web page, http://web.archive.org/web/20020608125127/http://www.natech-inc.com/arcdirector/index.html, published Jun. 8, 2002.
Native American Technologies, "ArcSentry Weld Quality Monitoring System" web page, http://web.archive.org/web/20020608124903/http://www.natech-inc.com/arcsentry1/index.html, published Jun. 8, 2002.
Native American Technologies, "Official NAMeS Web Site" web page, http://web.archive.org/web/20020903210256/http://www.natech-inc.com/names/names.html, published Sep. 3, 2002.
Native American Technologies, "P/NA.3 Process Modelling and Optimization" web pages, http://web.archive.org/web/20020608125619/http://www.natech-inc.com/pna3/index.html, published Jun. 8, 2002.

(56) References Cited

OTHER PUBLICATIONS

Native American Technologies, "Process Improvement Products" web page, http://web.archive.org/web/20020608050736/http://www.natech-inc.com/products.html, published Jun. 8, 2002.

Natural Point, Trackir; http://www.naturalpoint.com/trackir/, Dec. 2003.

Numerical Simulation F Arc Welding Process and its Application Dissertation for Ohio State University by Min Hyun Cho, M.S. 2006: See Internet as this document is security protected) ohttps://etd.ohiolink.edu/ap:0:0:APPLICATION_PROCESS=DOWNLOAD_ETD_SUB_DOC_ACCNUM:::F1501_ID:osu1155741113, attachment.

NZ Manufacturer Game promotes welding trade careers; http://nzmanufacturer.co.nz/2011/11/gme-promotes-welding-trade-careers/ . . . Compentenz Industry Training; www.competenz.org.nz; Game promotes welding trade careers, Nov. 7, 2011.

OptiTrack: Motion Capture Systems: http://www.naturalpoint.com/optitrack/, Mar. 2005.

Penrod, Matt; "New Welder Training Tools," EWI PowerPoint presentation, 2008.

PhaseSpace: Optical Motion Capture: http://phasespace.com/, 2009.

Playstation; Move Motion Controller: http://us.playstation.com/ps3/playstation-move/, Mar. 2010.

Polhemus: Innovation in Motion: http://polhemus.com/?page=researchandtechnology, 1992.

Porter, Nancy C., Edison Welding Institute; J. Allan Cote, General Dynamics Electrict Boat; Timothy D. Gifford, VRSim; and Wim Lam, FCS Controls—Virtual Reality Welder Training—Project No. S1051 Navy Man Tech Program; Project Review for Ship Tech 2005,—Mar. 1, 2005, Biloxi, MS, http://www.nsrp.org/6-Presentations/WD/Virtual_Welder.pdf.

Porter, Nancy C., Edison Welding Institute; J.Allan Cote, General Dynamics Electric Boat; Timoty D. Gifford, VRSim; and Wim Lam, FCS Controls—Virtual Reality Welder Training—Session 5; Joining Technologies for Naval Applications; 2007.

Porter et al, EWI-CRP Summary Report SR0512, Jul. 2005—Virtual Reality Welder Training.

Quebec International, May 28, 2008 "Video Game" Technology to Fill Growing Need; http://www.mri.gouv.qc.ca/portail/_scripts/actualities/viewnew.sap?NewID=5516.

Ryu, Jonghyun, Jaehoon Jung, Seojoon Kim, and Seungmoon Choi, "Perceptually Transparent Vibration Rendering Using a Vibration Motor for Haptic Interaction," 16 IEEE International Conference on Robot & Human Interactive Communication, Jeju, Korea, Aug. 26-29, 2007.

Sandor, Christian, Gudrun Klinker, "PAARTI: Development of an Intelligent Welding Gun for BMW," PIA 2003, Tokyo, Japan, Technical University of Munich Department of Informatics, Oct. 7, 2003.

Sandor, Christian, Gudrun Klinker; "Lessons Learned in Designing Ubiquitous Augmented Reality User Interfaces," Emerging Technologies of Augmented Reality Interfaces, Eds. Haller, M, Billinghurst, M., and Thomas, B., Idea Group Inc., 2006.

ShotOfFuel; Wii Head Tracking for 3D, http://www.youtube.com/watch?v=1x5ffF-0Wr4, Mar. 19, 2008.

Stone, R. T., K. Watts, and P. Zhong, "Virtual Reality Integrated Welder Training, Welding Research," Welding Journal, vol. 90, Jul. 2011, pp. 136-s-141-s, https://app.aws.org/wj/supplement/wj201107_s136.pdf.

TCS News & Events: Press Release: TCS wins the "People Choice" award from National Science Foundation, USA, pp. 1-6; Press Release May 21, 2012; http://www.tsc.com/news_events/press_releases/Pages/TCS_People_Choice_award_Natio . . . .

TeachWeld: Welding Simulator/Hands-On Learning for Welding: http://realityworks.com/products/teachweld-welding-simulator; 2012.

Terebes; miscellaneous examples from http://www.terebes.uni-bremen.de.

The Rutgers Master II—New Design Force-Feedback Glove by Mourad Bouzit, Member, IEEE,Grigore Burdea, Senior Member, IEEE, George Popescu, Member, IEEE, and Rares Bolan, Student Member, found in IEEE/ASME Transactions on Mechatronics, vol. 7, No. 2, Jun. 2002.

thefabricator.com—Arc Welding Article; Heston, Tim, Virtual welding—Training in a virtual environment gives welding students a leg up—Mar. 11, 2008.

Tschurner, Petra, Hillers, Bernd, and Graeser, Axel; "A Concept for the Application of Augmented Realty in Manual Gas Metal Arc Welding," Proceedings of the International Symposium on Mixed and Augmented Reality, 2002.

Vicon: Motion Capture Systems: http://vicon.com/, Dec. 1998.

Virtual Reality Training Manual Module 1—Training Overview—a Guide for Gas Metal Arc Welding—EWI 2006.

VRTEX Virtual Reality Arc Welding Trainer, Lincoln Electric; http://www.lincolnelectric.cm/en-us/equipment/training-equipment/Pages/vrtex.aspx; accessed: Apr. 11, 2013.

Welding Journal, American Welding Society, Nov. 2007, https://app.aws.org/wj/2007/11/WJ_2007_11.pdf.

White, S., et al., "Low-Cost Simulated MIG Welding for Advancement in Technical Training," Virtual Reality, 15, 1, 69-81, Mar. 2011. ISSN:13594338 [Retrieved from EBSCOhost, Jun. 15, 2015]. European Patent Office Communication Appln No. 14738690.8 dated Jun. 20, 2018 (16 pgs.).

Canadian Office Action Appln. No. 2,914,374 dated Feb. 5, 2019 (5 pgs.).

\* cited by examiner

SYSTEM AND METHOD FOR DETERMINING WELD TRAVEL SPEED

This application is a Non-provisional Patent Application of U.S. Provisional Patent Application No. 61/837,905, entitled "SYSTEM AND METHOD FOR DETERMINING WELD TRAVEL SPEED", filed Jun. 21, 2013, which is incorporated herein by reference in its entirety.

BACKGROUND

The invention relates generally to welding operations and, more particularly, to systems and methods for determining weld travel speed.

Welding is a process that has increasingly become utilized in various industries and applications. Such processes may be automated in certain contexts, although a large number of applications continue to exist for manual welding operations. In both cases, such welding operations rely on a variety of types of equipment to ensure the supply of welding consumables (e.g., wire feed, shielding gas, etc.) is provided to the weld in appropriate amounts at the desired time.

A quality of a weld on a workpiece may depend on a number of factors, some of which may be controlled by a welding operator. For example, a quality of a weld on a workpiece may depend on a weld travel speed during a welding operation. The weld travel speed is a rate of travel of a welding electrode along a seam/joint being welded. Moreover, the weld travel speed is one parameter used to calculate the heat input to a weld and in certain configurations may be specified in a welding procedure specification (WPS). The weld travel speed may be manually calculated by dividing a weld travel distance (e.g., a distance the welding electrode travels along a seam/joint being welded) by a time that it takes to perform the weld across the weld travel distance. In certain configurations, the weld travel distance may be manually measured, such as by using a tape measure or another measurement device, and the time to perform the weld across the weld travel distance may be manually measured, such as by using a stop watch. The weld travel speed may be recorded and/or analyzed for use in determining the quality of the weld and/or for training the welding operator. Unfortunately, such manual methods of determining the weld travel speed may use a person in addition to the welding operator, may not be calculated in real time, may not be able to provide real time feedback, and may be prone to errors.

BRIEF DESCRIPTION

In one embodiment, a welding system includes one or more sensors configured to provide a first indication correspond to a welding arc at a first time and to provide a second indication correspond to the welding arc at a second time. The welding system also includes processing circuitry configured to receive the first indication, to receive the second indication, and to determine a weld travel speed based on a weld length of the workpiece and a difference between the first and second times.

In another embodiment, a method for determining a weld travel speed includes receiving a first indication corresponding to a welding arc at a first time. Moreover, the first indication originated from one or more sensors. The method also includes receiving a second indication corresponding to the welding arc at a second time. The second indication originated from the one or more sensors. The method includes determining, using processing circuitry, the weld travel speed based on a distance traveled by a welding torch that formed the welding arc and a difference between the first and second times.

In a further embodiment, a welding system includes at least one sensor disposed configured to provide a first indication corresponding to a first welding time, a second indication corresponding to a second welding time, or a combination thereof. The welding system includes processing circuitry processing circuitry configured to receive the first indication, to receive the second indication, and to derive a weld travel speed based on the first indication, the second indication, or a combination thereof, and a weld length of the workpiece, and wherein the at least one sensor is communicatively coupled to the processing circuitry.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
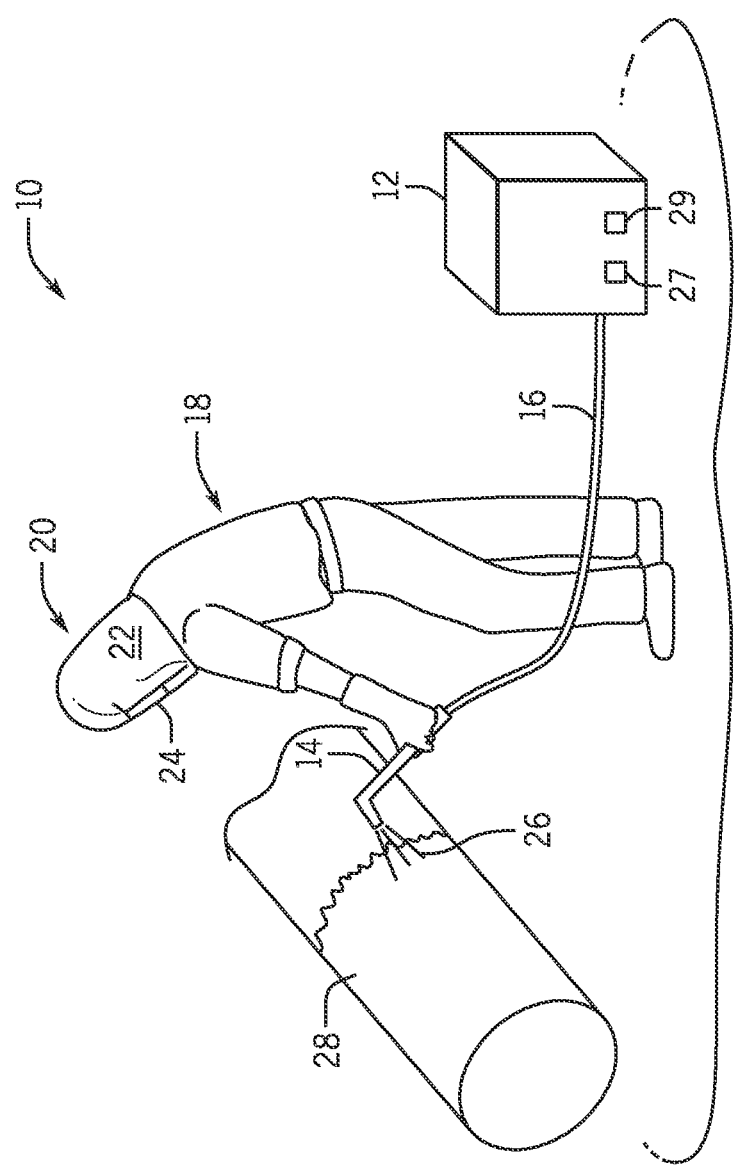
FIG. 1 is an illustration of an embodiment of a welding system in which a weld travel speed may be determined, in accordance with aspects of the present disclosure.

Embodiments of the present invention may be used in any application where weld travel speed may be determined. For example, FIG. 1 illustrates an arc welding system 10 in which the weld travel speed may be determined. As depicted, the arc welding system 10 may include a power supply system 12 that generates and supplies welding power to an electrode 14 via a conduit 16. In the arc welding system 10, a direct current (DC) or alternating current (AC) may be used along with the consumable or non-consumable electrode 14 to deliver current to the point of welding. In such a welding system 10, an operator 18 may control the location and operation of the electrode 14 by positioning the electrode 14 and triggering the starting and stopping of the current flow. As illustrated, a helmet assembly 20 is worn by the welding operator 18. The helmet assembly 20 includes a helmet shell 22 and a lens assembly 24 that may be darkened to prevent or limit exposure to the light generated by a welding arc 26.

When the operator 18 begins the welding operation by applying power from the power supply system 12 to the electrode 14, the welding arc 26 is developed between the electrode 14 and a workpiece 28, such as the illustrated pipe. As may be appreciated, the workpiece 28 may be any suitable workpiece, such as a pipe, a vessel, a substantially flat structure, and so forth. The electrode 14 and the conduit 16 thus deliver current and voltage sufficient to create the welding arc 26 between the electrode 14 and the work piece 28. The welding arc 26 melts the metal (the base material and any filler material added) at the point of welding between the electrode 14 and the work piece 28, thereby providing a joint when the metal cools. The welding system 10 may be configured to form a weld joint by any suitable technique, including shielded metal arc welding (SMAW) (i.e., stick welding), gas tungsten arc welding (GTAW), gas metal arc welding (GMAW), flux-cored arc welding (FCAW), metal inert gas welding (MIG), tungsten inert gas welding (TIG), gas welding (e.g., oxyacetylene welding), sub-arc welding (SAW), and/or resistance welding. As may be appreciated, shielding gas may be used in certain applications, such as GTAW, GMAW, and FCAW, for example. Waveforms used during welding may include regulated metal deposition (RMD) type waveforms, among others, surface tension transfer (STT), cold metal transfer (CMT).

As described below, the weld travel speed may be determined by detecting times when the welding arc 26 passes one or more sensors. By using a distance between the one or more sensors and the detected times, the weld travel speed may be calculated. As may be appreciated, such a travel speed may be determined in any application where a travel speed indication is desired, such as in applications involving welding, cutting, grinding, induction heating, testing, and so forth. In one embodiment, the one or more sensors for deriving weld travel speed may be sensors 27 and 29 disposed in the power supply system 12, as described in more detail below. Other sensors, as described below with respect to FIGS. 2-7, may be used additional or in lieu of sensors 27, 29.

Figure 2:
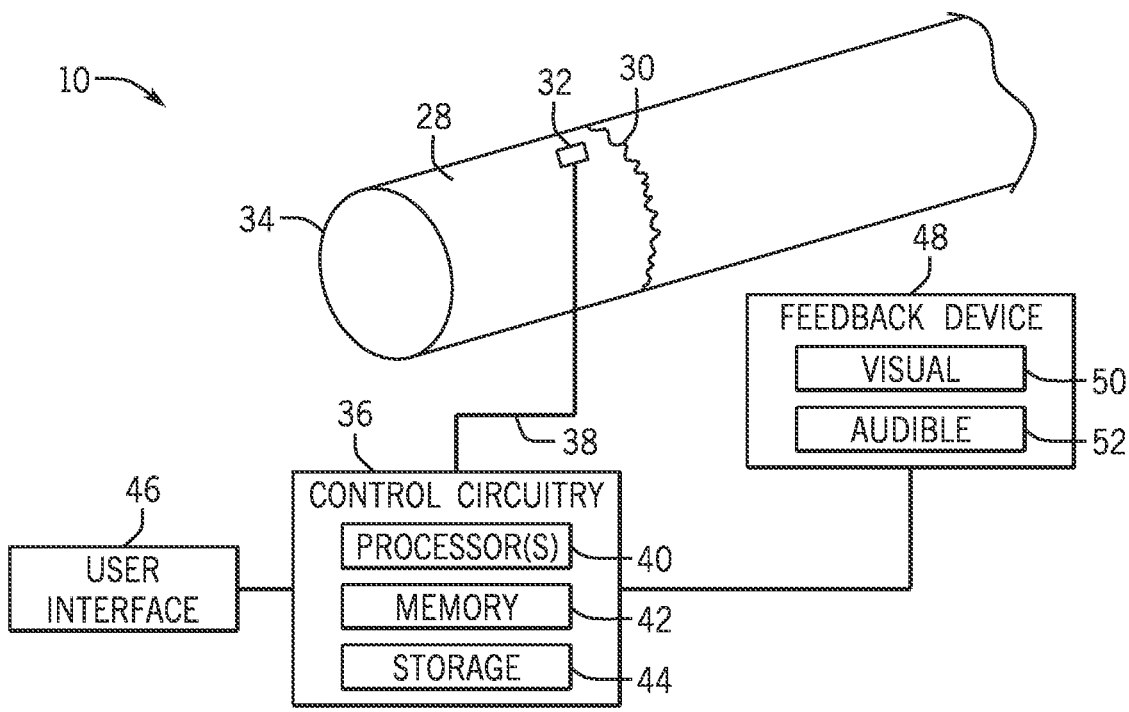
FIG. 2 is an illustration of an embodiment of a welding system including a sensor and control circuitry (or processing circuitry) to determine a weld travel speed, in accordance with aspects of the present disclosure.

FIG. 2 is an illustration of an embodiment of the welding system 10 including a sensor and control circuitry to determine the weld travel speed. It is to be noted that the processing circuitry may be alternatively or additionally used with the control circuitry. That is, the processing circuitry may be included as part of the control circuitry, may be communicatively coupled to the control circuitry, or may be separate from the control circuitry and included in an external device (e.g., cloud-based device). The processing circuitry may include a physical processor, memory, and storage. As illustrated, the workpiece 28 includes a joint 30 to be welded. A sensor 32 is disposed adjacent (e.g., next to, near, within 0 to 1 meter, on, etc.) to the workpiece 28. In certain embodiments, the sensor 32 may be disposed a predetermined distance from the joint 30 and/or directly on the workpiece 28. The sensor 32 may be configured to provide one or more indications corresponding to the welding arc 26 while the welding arc 26 is detected near the sensor 32. For example, the sensor 32 may be configured to provide an indication corresponding to the welding arc 26 at predetermined time intervals (e.g., sampling every 100 ms, between 1 to 50 ms, between 1 ms to 1 sec) and/or continuously (e.g., providing an output voltage corresponding to a temperature).

The sensor 32 may be any suitable device that can provide indications that correspond to the welding arc 26. For example, the sensor 32 may include at least one of a temperature sensor, a thermocouple, a bimetallic switch, a resistance temperature detector (RTD), a thermistor, a wax motor, an infrared (IR) sensor, a light sensor, and/or a proximity sensor. Accordingly, the indications may include temperature indications, light indications (e.g., brightness, photon count), and/or proximity indications (e.g., proximity of the sensor 32 from the arc 26, the electrode 14, and/or torch holder). Moreover, the sensor 32 may be configured to detect heat, light, and/or other emissions from the welding arc 26. The sensor 32 may additionally include a sensor suitable in detecting filler metal flow as the weld is created, and/or In certain embodiments, the sensor 32 may be pre-existing in the welding system 10 and/or may be used for another purpose (e.g., to detect a temperature of the workpiece 28), such as being used for another purpose before the sensor 32 is used to determine the weld travel speed. Although only one sensor 32 is illustrated adjacent to a weld length (e.g., perimeter) 34 of the workpiece 28, other embodiments may include any suitable number of sensors 32 adjacent to the weld length 34 of the workpiece 28. It is to be noted that the weld length may include a diameter of a pipe, or a length to be welded.

In the illustrated embodiment, indications from the sensor 32 are provided to control circuitry 36 over a wired connection 38. However, in other embodiments, indications from the sensor 32 may be provided to the control circuitry 36 wirelessly and/or using a portable storage media (e.g., flash drive, flash memory, universal serial bus (USB) device, etc.). The control circuitry 36 is configured to receive multiple indications from the sensor 32, and to determine a weld travel speed based on the weld length 34 of the workpiece 28 and a time (e.g., a difference between a first time when a first indication is received from the sensor 32 and a second time when a second indication is received from the sensor 32, where the first and second indications are provided from the sensors 32 when the welding arc 26 is at substantially the same location on the weld length 34 of the workpiece 28). Accordingly, the control circuitry 36 may be used to determine the weld travel speed automatically (e.g., without manually measuring the time for the welding arc 26 to travel around the weld length 34). Moreover, the control circuitry 36 may also be configured to determine the weld travel speed in real time (e.g., while a welding operation is being performed) and/or with real time feedback (e.g., feedback received while a welding operation is being performed), as described in detail below.

The control circuitry 36 may include one or more processors 40, memory devices 42, and/or storage devices 44. The processor(s) 40 may be used to execute software, such as data processing, instructions, weld travel speed determination, and so forth. Moreover, the processor(s) 40 may include one or more microprocessors, such as one or more "general-purpose" microprocessors, one or more special-purpose microprocessors and/or application specific integrated circuits (ASICS), one or more field programmable gate arrays (FPGAS), or some combination thereof. For example, the processor(s) 40 may include one or more reduced instruction set (RISC) processors.

The storage device(s) 44 (e.g., nonvolatile storage) may include read-only memory (ROM), flash memory, a hard drive, or any other suitable optical, magnetic, or solid-state storage medium, or a combination thereof. The storage device(s) 44 may store data (e.g., welding data, sensor data, time data, weld travel speed data, distance data, weld length data, etc.), instructions (e.g., software or firmware for determining weld travel speed, etc.), and any other suitable data.

The memory device(s) 42 may include a volatile memory, such as random access memory (RAM), and/or a nonvolatile memory, such as ROM. The memory device(s) 42 may store a variety of information and may be used for various purposes. For example, the memory device(s) 42 may store processor-executable instructions (e.g., firmware or software) for the processor(s) 40 to execute, such as instructions for determining the weld travel speed.

The welding system 10 includes a user interface 46 coupled to the control circuitry 36 and configured to enable an operator to provide a value of the length of the weld length 34 of the workpiece 28 to the control circuitry 36. In certain embodiments, the control circuitry 36 may receive the length of the weld length 34 via the user interface 46, while in other embodiments the control circuitry 36 may have the length of the weld length 34 preprogrammed and/or stored on the storage device(s) 44. As may be appreciated, in certain embodiments, the control circuitry 36 and/or the user interface 46 may be part of the welding power supply 12, a portable computing device, a desktop computer, a server (e.g., LAN server, WAN server, cloud-based server), and so forth. Indeed, cloud-based devices (e.g., servers accessible as cloud-based services) may include the processing or control circuitry 36 suitable for deriving weld travel time, weld heat input, among other derivations, using the techniques described herein. Moreover, a feedback device 48 is coupled to the control circuitry 36 and configured to provide visual feedback 50 and/or audible feedback 52 corresponding to weld travel speed to a welding operator during and/or after a welding operation is performed. In certain embodiments, the feedback device 48 may be configured to provide haptic feedback, or some other type of physical indication to the welding operator (e.g., via a glove or welding torch that vibrates, etc.). The visual feedback 50 may be provided using a display, one or more light-emitting diodes (LEDs), or another suitable visual device. Moreover, the audible feedback 52 may be provided using a speaker or another suitable audible device. In certain embodiments, the feedback device 48 may be integrated into a welding torch, welding helmet, or another suitable welding device. The feedback device 48 may be configured to provide feedback to a welding operator at predetermined time intervals, continuously, and/or as an alarm when a predetermined limit is reached. For example, an alarm (e.g., audible and/or visual) may be provided to a welding operator when the weld travel speed is too fast, too slow, within a predetermined range, outside a predetermined range, and so forth.

Figure 3:
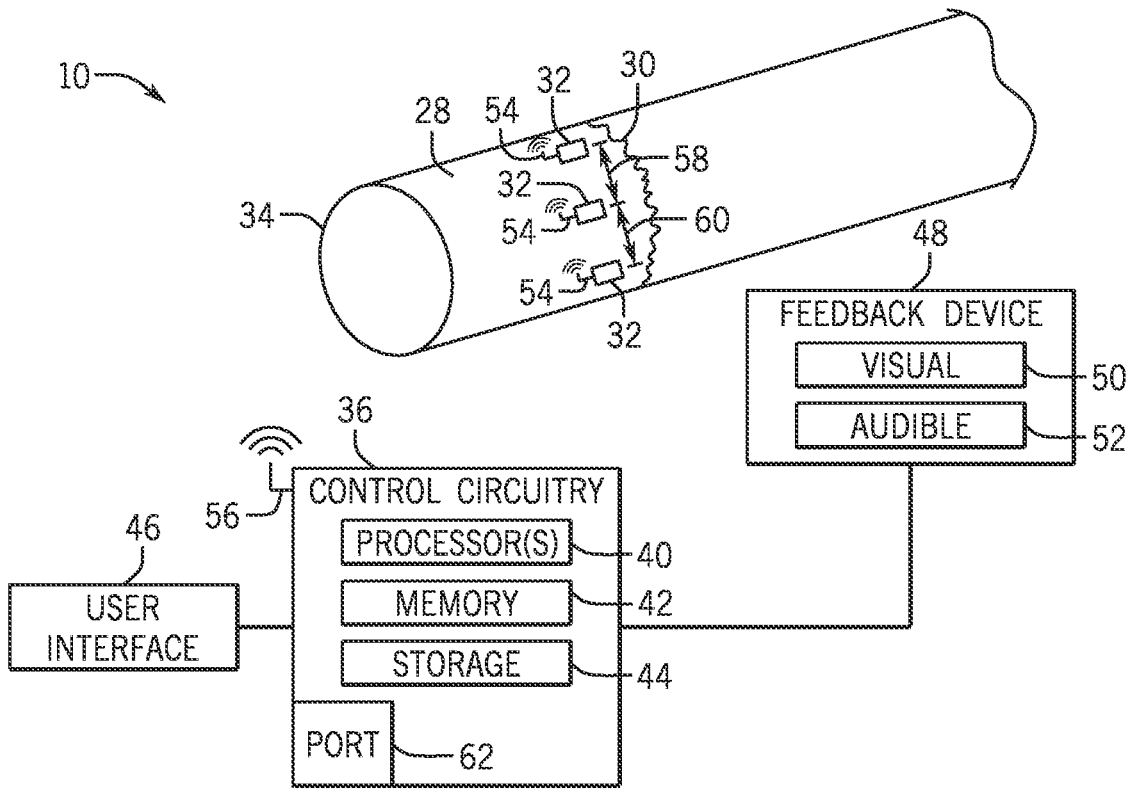
FIG. 3 is an illustration of an embodiment of a welding system including multiple sensors and control circuitry (or processing circuitry) to determine a weld travel speed, in accordance with aspects of the present disclosure.

FIG. 3 is an illustration of an embodiment of the welding system 10 including multiple sensors 32 and the control circuitry 36 to determine the weld travel speed. The sensors 32 are disposed adjacent to the weld length 34 of the workpiece 28 at multiple locations. As illustrated, the sensors 32 are configured for wireless communication 54. Furthermore, the control circuitry 36 is also configured for wireless communication 56. Accordingly, the sensors 32 may wirelessly provide indications corresponding to the welding arc 26 to the control circuitry 36. In other embodiments, the sensors 32 may provide indications to the welding arc 26 using wired communication and/or using a portable storage media. A distance 58 separates one pair of sensors 32, while a distance 60 separates another pair of sensors 32. As may be appreciated, the distances 58 and 60 may be substantially the same and/or the distances 58 and 60 may differ. Moreover, in certain embodiments, the distances 58 and 60 may be provided to the control circuitry 36, such as by using the user interface 46. Furthermore, in some embodiments, the distances 58 and 60 may be fixed and may be preprogrammed into the control circuitry 36. As illustrated, the control circuitry 36 may include a port 62, such as a USB port, for receiving data (e.g., indications from sensors 32, distances 58 and 60, etc.), such as data stored on a portable storage media.

During operation, one sensor 32 may be configured to provide a first indication corresponding to the welding arc 26 at a first time (e.g., as the welding arc 26 passes near the sensor 32). Furthermore, the control circuitry 36 may be configured to receive the first indication corresponding to the first time. For example, the control circuitry 36 may be configured to receive the first indication at the first time (e.g., in real time, while a welding operation is being performed) directly from the sensor 32, and may be configured to store data corresponding to the first indication together with data corresponding to the first time. In another example, the control circuitry 36 may be configured to receive the first indication and a representation of the first time from a device (e.g., a portable storage media, a portable device, etc.) that is not the sensor 32 (e.g., not in real time, not while a welding operation is being performed).

Another sensor 32 may be configured to provide a second indication corresponding to the welding arc 26 at a second time (e.g., as the welding arc 26 passes near the sensor 32). As mentioned earlier, the second indication may include temperature indications, light indications (e.g., brightness, photon count), and/or proximity indications (e.g., proximity of the sensor 32 from the arc 26, the electrode 14, and/or torch holder). The control circuitry 36 may be configured to receive the second indication corresponding to the second time. For example, the control circuitry 36 may be configured to receive the second indication at the second time (e.g., in real time, while a welding operation is being performed) directly from the sensor 32, and may be configured to store the second indication together with a representation of the second time (e.g. value representative of the second time in milliseconds, seconds, datetime format, and so on). In another example, the control circuitry 36 may be configured to receive the second indication and a representation of the second time from a device (e.g., a portable storage media, a portable device, etc.) that is not the sensor 32 (e.g., not in real time, not while a welding operation is being performed). Moreover, the control circuitry 36 may be configured to determine the weld travel speed based on a distance (e.g., distance 58 or 60) between the sensors 32 and a difference between the first and second times. Accordingly, the control circuitry 36 may be used to determine the weld travel speed.

Figure 4:
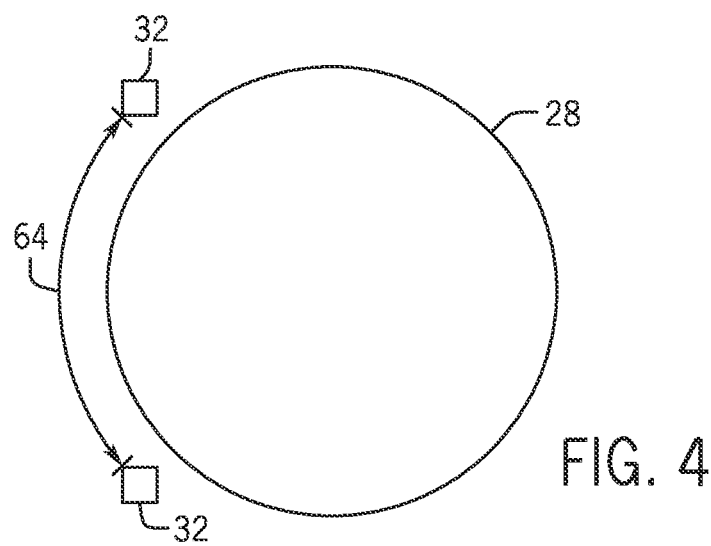
FIG. 4 is a cross-sectional view of an embodiment of a weld travel distance around a portion of a workpiece, in accordance with aspects of the present disclosure.

FIG. 4 is a cross-sectional view of an embodiment of a weld travel distance around a portion of the workpiece 28. Specifically, a distance between the sensors 32 is represented by an arc length 64. The arc length 64 is used as the distance for determining the weld travel speed for a weld performed around a portion of the circumference of the workpiece 28. Accordingly, the arc length 64 is provided to the control circuitry 36 for calculating the weld travel speed.

Figure 5:
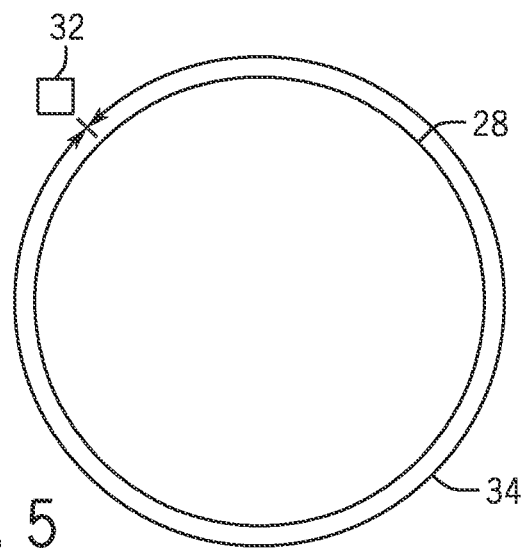
FIG. 5 is a cross-sectional view of an embodiment of a weld travel distance around a perimeter of a workpiece, in accordance with aspects of the present disclosure.

Moreover, FIG. 5 is a cross-sectional view of an embodiment of a weld travel distance around the entire weld length 34 of the workpiece 28. As illustrated, a distance between a first indication from the sensor 32 and a second indication from the sensor 32 is represented by the length of the weld length 34. The length of the weld length 34 (e.g., circumference of the workpiece 28) is used as the distance for determining the weld travel speed for a weld performed around the workpiece 28 when only one sensor 32 is used. In such an embodiment, the length of the weld length 34 may be provided to the control circuitry 36 for calculating the weld travel speed.

Figure 6:
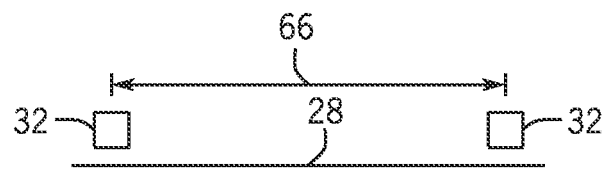
FIG. 6 is a cross-sectional view of an embodiment of a linear weld travel distance, in accordance with aspects of the present disclosure.

Furthermore, FIG. 6 is a cross-sectional view of an embodiment of a linear weld travel distance. Specifically, a distance between the sensors 32 is represented by a linear length 66. The linear length 66 is used as the distance for determining the weld travel speed for a weld performed on a substantially flat portion of the workpiece 28. Accordingly, the linear length 66 may be provided to the control circuitry 36 for calculating the weld travel speed.

As may be appreciated, a distance between the sensors 32 may be any suitable distance that represents a distance traveled by a welding torch to perform a welding operation. For example, the distance may be for a zigzag shape, a curved shape, a length of a pattern to be welded, a distance to be welded on any type of shaped workpiece, a distance of a circuitous route, or a combination thereof.

Figure 7:
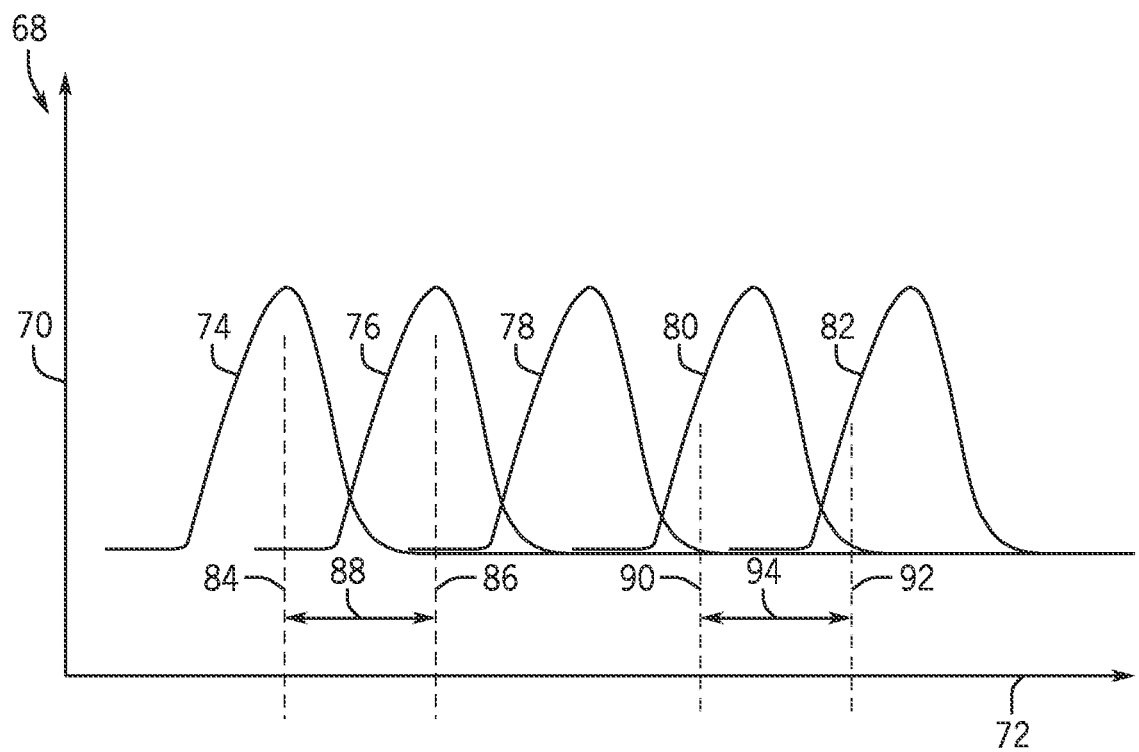
FIG. 7 is a chart of an embodiment of processes for determining a time between sensor indications, in according with aspects of the present disclosure.

FIG. 7 is a chart 68 of an embodiment of processes for determining a time between sensor indications. In the illustrated embodiment, the sensor indications are taken from temperature sensors. Accordingly, the chart 68 illustrates temperatures 70 relative to time 72. Specifically, a first set of indications 74 from a first temperature sensor, a second set of indications 76 from a second temperature sensor, a third set of indications 78 from a third temperature sensor, a fourth set of indications 80 from a fourth temperature sensor, and a fifth set of indications 82 from a fifth temperature sensor are illustrated. Each of the first, second, third, fourth, and fifth sets of indications 74, 76, 78, 80, and 82 illustrates that the temperature indications change from a nominal temperature to a peak temperature as the welding arc 26 passes a respective temperature sensor. For example, at a time 84, the first set of indications 74 is at a local peak temperature and, at a time 86, the second set of indications 76 is at a local peak temperature.

Moreover, a time 88 between the peak temperatures indicates a time that it takes for the welding arc 26 to travel from the first temperature sensor to the second temperature sensor. As may be appreciated, any two corresponding temperatures between sensors may be used to determine a time that it takes for the welding arc 26 to travel between temperature sensors. For example, at a time 90, the temperature of the fourth set of indications 80 substantially matches the temperature of the fifth set of indications 82 at a time 92, and the temperatures at times 90 and 92 are both on the rising (e.g., heating) side of the temperature curve. Accordingly, a time 94 between the temperatures at times 90 and 92 indicates a time it takes for the welding arc 26 to travel from the fourth temperature sensor to the fifth temperature sensor.

As may be appreciated, the matching temperatures may be taken from the rising or the falling (e.g., cooling) side of the temperature curve, as long as both temperatures are taken from the same side of the curve. In certain embodiments, a weld travel speed may be determined at any suitable interval along the temperature curve. For example, the weld travel speed may be determined at 1, 2, 4, 10, 50, 100, 1000 or more different temperatures along the temperature curve. Furthermore, by calculating more than one weld travel speed, changes in weld travel speed, weld travel speed averages, weld travel speed acceleration, comparisons between weld travel speeds, and/or consistency in weld travel speeds may be determined. Moreover, in some embodiments, an area under the temperature curve for different sensors may be used to determine a time between sensor indications. As may be appreciated, any suitable analysis (e.g., statistical analysis, etc.) and/or correction shifting may be used to determine a time between sensor indications. Furthermore, in certain embodiments, indications from any type of sensor may be used to determine a time it takes for the welding arc 26 to travel between sensors. In some embodiments, different types of sensors may be used together to determine a time it takes for the welding arc 26 to travel between sensors. For example, one sensor may be a temperature sensor and another sensor may be a proximity sensor. Accordingly, the control circuitry 36 may be configured to determine a time it takes for the welding arc 26 to travel between the two different types of sensors.

Figure 8:
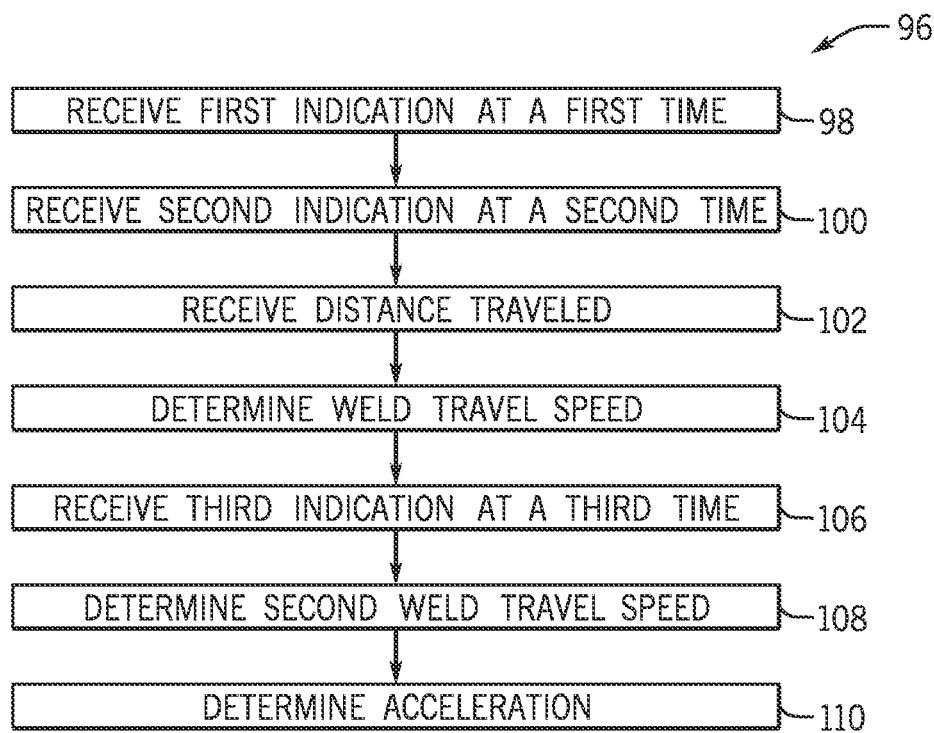
FIG. 8 is flow chart of an embodiment of a process for determining a weld travel speed, in according with aspects of the present disclosure.

FIG. 8 is flow chart of an embodiment of a process 96 for determining a weld travel speed. A processing device, such as the control circuitry 36, receives a first indication (e.g., temperature, IR signal, proximity signal, light signal, light level, voltage signal, current signal, filler metal feeding rate signal indicative of filler metal disposed on the weld, indication of a gas flow signal indicative of gases used in welding, a torch trigger sensor indicative of a trigger on/off position, etc.) corresponding to a welding arc (e.g., the welding arc 26) at a first time (block 98). The indication of gas flow signal may include a valve position indication and/or a gas flow rate indication. In certain embodiments, the first indication may originate from one or more sensors (e.g., a first sensor, such as the sensors 32). Furthermore, the first indication may be received directly from the one or more sensors, or may be received from a portable storage media. Moreover, the processing device receives a second indication (e.g., temperature, IR signal, proximity signal, voltage signal, current signal, filler metal feeding rate signal, indication of gas flow, indication of trigger position, etc.) corresponding to the welding arc at a second time (block 100). In some embodiments, the second indication may originate from the one or more sensors 32 (e.g., the first sensor, a second sensor, etc.). Furthermore, the second indication may be received directly from the one or more sensors, or may be received from a portable storage media. The processing device (e.g., circuit 36) receives a distance traveled by the welding arc (block 102). For example, the processing device may receive (e.g., a user input) a distance between a first and second sensor, which is substantially equal (e.g., approximately the same, within 1 cm, etc.) to the distance traveled by a welding torch (e.g., from operator input and/or from a storage device). As another example, the processing device may receive a distance around a workpiece 28 (e.g., from the first sensor 32 back to the first sensor 32 or user inputted distance).

The processing device determines the weld travel speed based on the distance traveled by the welding torch that formed the welding arc and a difference between the first and second times (block 104). For example, the weld travel speed may be determined by dividing the distance traveled by the welding torch by the difference between the first and second times. In certain embodiments, the processing device receives a third indication corresponding to the welding arc at a third time (block 106). Moreover, in some embodiments the third indication may originate from the one or more sensors (e.g., the first sensor, the third sensor). The processing device may then determine a second weld travel speed based on a second distance traveled by the welding torch that formed the welding arc and a difference between the second and third times (block 108). Furthermore, the processing device may determine other suitable parameters, such as acceleration or a statistical value (e.g., mean, variance, etc.), based on the weld travel speed and the second weld travel speed (block 110). As may be appreciated, blocks 106, 108, and 110 are optional and may not be performed. Accordingly, as described herein, the welding system 10 may be used to determine the weld travel speed automatically (e.g., without manually measuring the time for the welding arc 26 to travel a certain distance). Moreover, the welding system 10 may be used to determine the weld travel speed in real time and/or with real time feedback.

Figure 9:
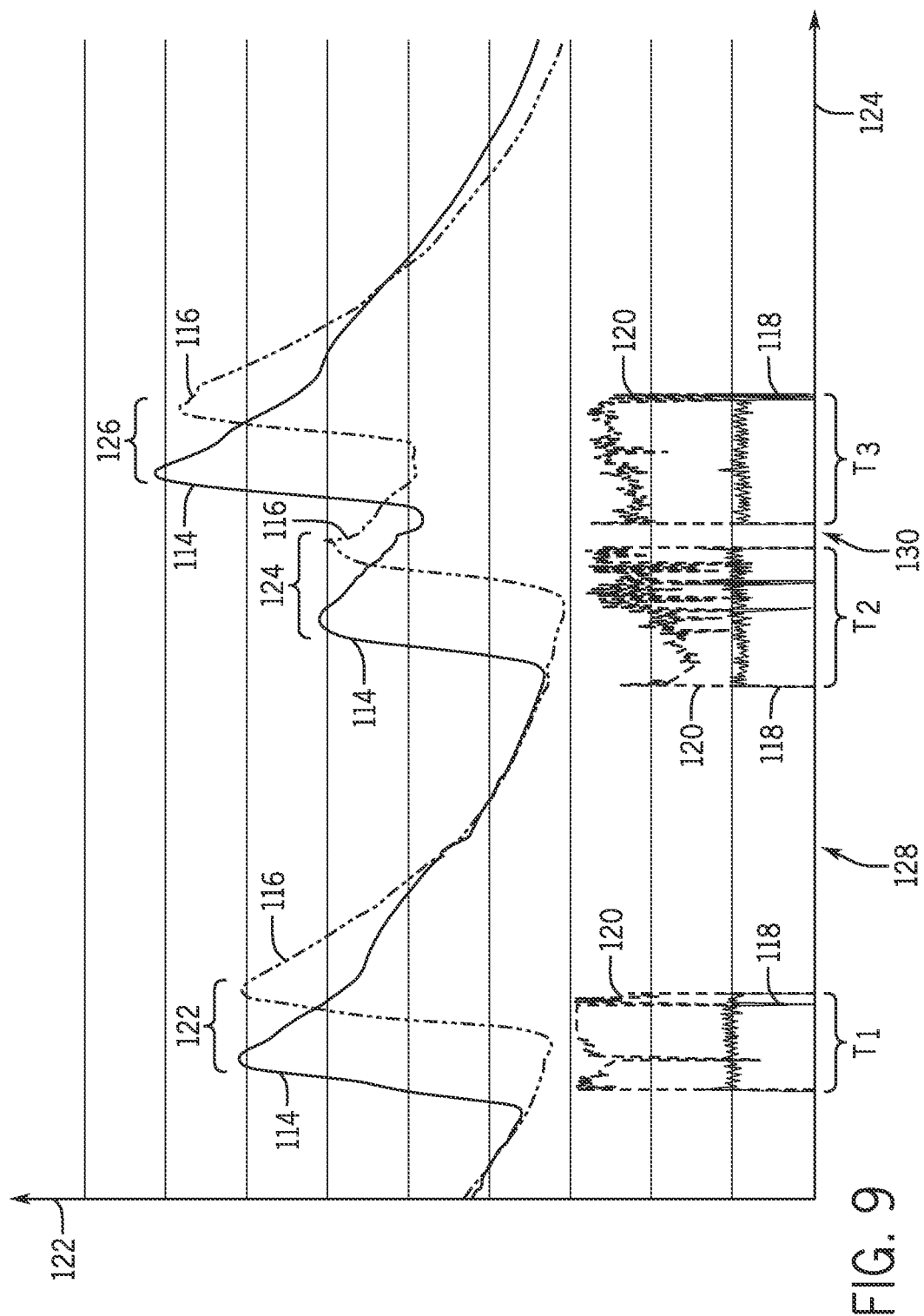
FIG. 9 is a chart of an embodiment of processes for determining a time between sensor indications, in according with aspects of the present disclosure.

Turning now to FIG. 9, the figure depicts an embodiment of a chart 112 showing temperature curves 114, 116, a voltage curve 118, and a current curve (e.g., amperage curve) 120 disposed onto an axis 122. A time axis 124 is also shown. In the depicted embodiment, the temperature curve 114 may be sensed by a first temperature sensor 32, while the temperature curve 116 may be sensed by a second temperature sensor 32. Additionally or alternatively, weld speed may be derived via voltage curve 118 sensed through voltage sensor 27 and/or current curve 120 sensed through current sensor 29. The voltage curve 118 and current curve 120 are representative of power being delivered by the power supply 12 and used to weld the workpiece 28. As illustrated, a welding activity 122 occurred at a time range T1, a welding activity 124 occurred at a time range T2, and a welding activity 126 occurred in a time range T3.

Detection of the welding activities 122, 124, and/or 126 may be automatic, for example, by detecting pauses 128, 130 between the welding activities 122, 124, and 126. In one example, a pause may be detected when voltage 118 and/or current 120 is at zero for longer than 1 second or more. The user may additionally or alternative inform the control circuitry 36 of the welding activities 122, 124, and/or 126 via the user interface 46. The sensors 27, 29 may be disposed anywhere on the power supply system 12, including on or adjacent to cabling (e.g., cable delivering power to the torch), or in any location suitable for observing or deriving current and/or voltage. For example, the sensor 27 may include a voltage sensor on cabling, in the torch, in the power supply, and/or any location suitable for measuring voltages delivered during welding. Likewise, the sensor 29 may be disposed on the cabling, in the power supply, in the torch and/or anywhere suitable for observing current delivered during welding.

To derive a weld speed by using a voltage indication received via the sensor 27 and/or a current indication received via the sensor 29, the process 96 depicted in FIG. 8 may be used. Turning back now to FIG. 8, at block 98, the control circuitry 36, receives a first indication (e.g., first voltage level 118 and/or first current level 120 at a beginning time for ranges T1, T2, and/or T3) corresponding to a welding arc (e.g., the welding arc 26) at a first time (block 98). Furthermore, the first indication may be received directly from the one or more sensors 27, 29, or may be received from a portable storage media. Moreover, the processing device receives a second indication (e.g., first voltage level 118 and/or first current level 120 at an ending time for ranges T1, T2, and/or T3) corresponding to the welding arc at a second time (block 100). In some embodiments, the second indication may originate from the one or more sensors (e.g., the first sensor 27, 29, a second sensor 27, 29, etc.). Furthermore, the second indication may be received directly from the one or more sensors 27, 29, or may be received from a portable storage media. The processing device (e.g., circuit 36) receives a distance traveled by the welding arc (block 102). For example, the processing device may receive (e.g., a user input) a distance traveled by a welding torch (e.g., from operator input and/or from a storage device) from the beginning of T1, T2, T3, to the end of T1, T2, T3. As another example, the processing device may receive a distance around a workpiece 28. In embodiments where sensors 32 are used additional to the sensors 27, 29, the distances may be derived by using the sensors 32 as described above. Indeed, the sensors 27, 29 may be combined with the sensors 32 to derive multiple weld speeds for comparison, averaging, and to provide redundancy during operations.

The processing device determines the weld travel speed based on the distance traveled by the welding torch that formed the welding arc and a difference between the first and second times (block 104). For example, the weld travel speed may be determined by dividing the distance traveled by the welding torch by the difference between the first and second times. In certain embodiments, the processing device receives a third indication corresponding to the welding arc at a third time (block 106). Moreover, in some embodiments the third indication may originate from the one or more sensors (e.g., the first sensor, the third sensor). The processing device may then determine a second weld travel speed based on a second distance traveled by the welding torch that formed the welding arc and a difference between the second and third times (block 108). Furthermore, the processing device may determine other suitable parameters, such as acceleration or a statistical value (e.g., mean, variance, etc.), based on the weld travel speed and the second weld travel speed (block 110). As may be appreciated, blocks 106, 108, and 110 are optional and may not be performed.

Additionally to arc 26 detection, the sensors 27, 29 may be used to calculate energy input used during each of the time ranges T1, T2, T3, for example, in kilojoules per inch. In one example, a constant multiplied by voltage 118 and again multiplied by current 120 may then be divided by the distance traveled to arrive an average kilojoules per inch. The kilojoules per inch value may additionally be combined with recorded temperatures to derive a weld quality. It is to be understood that the sensors 27, 29, and 32 may be used in combination with each other. For example, a first indication at a first time (block 98) may be received via sensor 27, and a second indication at a second time may be received via sensor 32, or vice versa.

In one example, the user 18 may read or barcode a work order. The weld distance 34 for the workpiece 28 about to be welded may be included in the work order, may be inputted by the user 18, or may be derived based on the workpiece 28 circumference (for non-planar workpieces). The user 18 may then weld the workpiece 28. A heat input for the weld, such as an average energy per distance may be derived. For example, an average of an instantaneous voltage times amperage calculation (e.g., Voltage×Amps=Watts=Joules/Sec) may be derived. Total weld time may be determined based on the start and stop time of the weld, such as by observing current and voltage indications, or other indication as mentioned above. Heat input, for example, in KJoules/inch may then be determined, based on an equation Joules/Sec×total weld time/weld distance 34.

In another embodiment, a weld pass time may be determined, based on volt and/or current sensing of arc on-time and an indication of a start and stop of the weld pass. As noted above, the indications may include user input indications (e.g., the user 18 may enter the start, stop times), and/or automatic indications such as indications based on the sensors 32 (e.g., temperature, IR signal, proximity signal, light signal, light level, voltage signal, current signal, filler metal feeding rate signal, indication of gas flow signal, indication of torch trigger position, and so on). If the weld distance 34 is known, then the weld travel speed can be determined.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system comprising:
first and second sensors configured to be disposed at least one of adjacent to a workpiece or on the workpiece, the first sensor corresponding to a predetermined first location on the workpiece and the second sensor corresponding to a predetermined second location on the workpiece, the first sensor configured to provide a first indication corresponding to a first time that a welding arc is at the predetermined first location, the second sensor configured to provide a second indication corresponding to a second time that the welding arc is at the predetermined second location; and
processing circuitry configured to receive the first indication, to receive the second indication, and to determine a weld travel speed based on a sensor distance representative of a fixed distance between the predetermined first location and the predetermined second location and a difference between the first and second times.

2. The welding system of claim 1, wherein the first and second sensors each comprise a temperature sensor, an infrared (IR) sensor, a light sensor, a proximity sensor, or a filler metal feed sensor, and wherein the first indication, second indication, or combination thereof, comprises a temperature indication, a light-based indication, or a proximity indication.

3. The welding system of claim 1, wherein the processing circuitry is configured to receive the sensor distance.

4. The welding system of claim 1, comprising a feedback device configured to provide to a user a visual feedback, an audible feedback, a haptic feedback, or a combination thereof, corresponding to the weld travel speed during a welding operation.

5. The welding system of claim 1, wherein the processing circuitry is configured to derive a heat input of a welding operation based on the first and second indications and a weld length.

6. The welding system of claim 1, wherein at least one of the first sensor or the second sensor comprises a temperature sensor.

7. The welding system of claim 1, wherein at least one of the first sensor or the second sensor comprises an infrared (IR) sensor.

8. The welding system of claim 1, wherein at least one of the first sensor or the second sensor comprises a light sensor.

9. The welding system of claim 1, wherein at least one of the first sensor or the second sensor comprises a proximity sensor.

10. A method for determining a weld travel speed, comprising:
receiving, using processing circuitry, a first indication corresponding to a welding arc being present at a predetermined first location at a first time, wherein the first indication originated from a first sensor disposed in association with the predetermined first location adjacent to a workpiece or on the workpiece;
receiving, using the processing circuitry, a second indication corresponding to the welding arc being present at a predetermined second location at a second time, wherein the second indication originated from a second sensor disposed in association with the predetermined second location adjacent to the workpiece or on the workpiece; and
determining, using the processing circuitry, the weld travel speed based on a sensor distance representative of a fixed distance between the predetermined first location and the predetermined second location and a difference between the first and second times.

11. The method of claim 10, wherein the first and second sensors each comprise a temperature sensor, an IR sensor, a light sensor, or a proximity sensor.

12. The method of claim 10, comprising receiving, via a user interface, the sensor distance, wherein a distance traveled by a welding torch is determined by the processing circuitry using the sensor distance.

13. The method of claim 12, wherein the sensor distance is substantially equal to the distance traveled by the welding torch.

14. The method of claim 12, wherein the sensor distance is different than the distance traveled by the welding torch.

15. The method of claim 10, comprising receiving a third indication corresponding to the welding arc being present at a predetermined third location on the workpiece at a third time, determining a second weld travel speed based on a second distance traveled by a welding torch that created the welding arc and a difference between the second and third times, and determining an acceleration, a statistical value, or some combination thereof, based on the weld travel speed and the second weld travel speed, wherein the third indication originated from a third sensor.

* * * * *